US008176129B2

(12) United States Patent
Dennard et al.

(10) Patent No.: US 8,176,129 B2
(45) Date of Patent: May 8, 2012

(54) SYSTEM AND METHOD OF SENDING COMPRESSED HTML MESSAGES OVER TELEPHONY PROTOCOL

(75) Inventors: Mark D. Dennard, Decatur, GA (US); John R. Dinglef, Dallas, GA (US); Christopher E. Holladay, Marietta, GA (US); Jessica E. Marceau, Duluth, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 778 days.

(21) Appl. No.: 11/845,641

(22) Filed: Aug. 27, 2007

(65) Prior Publication Data

US 2009/0063705 A1 Mar. 5, 2009

(51) Int. Cl.
*G06F 15/16* (2006.01)
(52) U.S. Cl. ......... 709/206; 709/203; 709/227; 709/230
(58) Field of Classification Search .................. 709/203, 709/206, 227, 230
See application file for complete search history.

(56) References Cited

U.S. PATENT DOCUMENTS

| 6,891,811 | B1 | 5/2005 | Smith et al. |
| 6,958,999 | B1 * | 10/2005 | Bolsee ..................... 370/395.52 |
| 2003/0026289 | A1 | 2/2003 | Mukherjee et al. |
| 2003/0231207 | A1 | 12/2003 | Huang |
| 2004/0196866 | A1 | 10/2004 | Park et al. |
| 2005/0086295 | A1 | 4/2005 | Cunningham et al. |
| 2005/0114470 | A1 | 5/2005 | Bal |
| 2005/0278418 | A1 * | 12/2005 | Rathakrishnan et al. ..... 709/203 |
| 2006/0031523 | A1 | 2/2006 | Morris |
| 2006/0085534 | A1 * | 4/2006 | Ralston et al. ................ 709/223 |
| 2006/0148495 | A1 * | 7/2006 | Wilson .......................... 455/466 |
| 2006/0235992 | A1 * | 10/2006 | Matias et al. ................. 709/236 |
| 2007/0294333 | A1 * | 12/2007 | Yang et al. .................... 709/203 |
| 2008/0109528 | A1 * | 5/2008 | Knight et al. ................. 709/217 |

OTHER PUBLICATIONS

"Enabling SMS in SS7 Telephony Applications Using Intel® NetStructure™ SS7 Boards and Signaling Gateways", pp. 1-13, Intel in Communications, Application Note.

* cited by examiner

*Primary Examiner* — Phuoc Nguyen
(74) *Attorney, Agent, or Firm* — John Pivnichny; Roberts Mlotkowski Safran & Cole, P.C.

(57) ABSTRACT

A system and method for sending compressed html messages and, more particularly, a system and method for sending compressed html messages over a telephony protocol, the method comprises compressing an html message and sending the compressed html message via a telephony protocol. The compressed html message is sent as an SMS message and the telephony protocol is SS7 protocol, bypassing TCP/IP. The compressed html message can be coded with a return number, forcing a return message to be sent via a text message over SS7 protocol. The system and method includes a computer infrastructure operable to compress an html message and send the compressed html message such as and SMS message via a telephony protocol. A computer program product comprising a computer usable medium having readable program code embodied in the medium for performing the processes is also contemplated.

28 Claims, 6 Drawing Sheets

SYSTEM AND METHOD OF SENDING COMPRESSED HTML MESSAGES OVER TELEPHONY PROTOCOL

FIELD OF THE INVENTION

The invention generally relates to a system and method for sending compressed html messages and, more particularly, the invention relates to a system and method for sending compressed html messages over a telephony protocol.

BACKGROUND OF THE INVENTION

Technology is ubiquitous in modern life, often taking the place of human interaction. For example, computing networks such as text messaging, email, blogs, etc. have begun to supplant face to face interactions between people. Often this has the advantage of increasing productivity and efficiency.

One type of technology is Short Message Service (SMS), which is a service available on mobile telephones and other mobile devices that permits the sending of short messages, e.g., text messaging. The term text messaging and its variants are commonly used to describe SMS. Text messages are also used to interact with automated systems, such as ordering products and services or participating in contests or polls.

Transmission of the short messages can be performed through different protocols such as SS7 (Signaling System #7) within the standard GSM MAP. SS7 is a set of telephony signaling protocols used by the telephone network to exchange information. That is, SS7 provides a universal structure for telephony network signaling, messaging, interfacing, network maintenance, establishment of a call, exchanging user information, call routing, billing structures, and supporting Intelligent network (IN) services, amongst other functions. SS7 messages can convey information such as:

"I am forwarding to a call placed from 202-555-5555 to 212-555-6666. Look for it on trunk 067. . . . Release the call and play a busy tone. The route to XXX is congested. Do not send any messages unless they are a priority."

In practice, SMS messages are sent with a forward_short_message, whose payload length is limited by the constraints of the signaling protocol to precisely 140 bytes (140 bytes=140*8 bits=1120 bits). This translates to 160 7-bit characters, 140 8-bit characters, or 70 16-bit characters. However, larger messages can be segmented over multiple messages, in which case the receiving party is responsible for reassembling the message.

SMS is widely used for delivering digital content such as news alerts, financial information, logos and ringtones. Such messages are also known as premium-rated short messages (PSMS). The subscribers are charged extra for receiving this premium content, in addition to the charge for regular text messaging. In one known implementation, Cingular®, for example, has implemented a SMS powered voting service for a popular television show. (Cingular is a trademark of Cingular in the United States, other countries, or both.) In this implementation, a message is sent to a user, perhaps via TCP/IP or SS7. The recipient can then view the message and vote for a particular contestant by sending a text message. This is accomplished by the recipient manually entering a telephone message with the text message to be sent.

However, with SMS, as noted above, in any type of application, the user must text a message to a certain number, but this interaction is error prone. It relies on the user to properly enter the SMS message, telephone number, etc. and send it to the correct address. In addition, in an example of voting, the user may not remember all the choices during the polling time, thus leading to an incorrect entry. Moreover, the length of a message is limited by the constraints of the signaling protocol.

Accordingly, there exists a need in the art to overcome the deficiencies and limitations described hereinabove.

SUMMARY OF THE INVENTION

In a first aspect of the invention, a method comprises compressing an html message and sending the compressed html message via a telephony protocol.

In another aspect of the invention, a system for deploying an application in a computing environment comprises a computer infrastructure operable to compress an html message and force the compressed html message to be sent via a telephony protocol.

In another aspect, a method for deploying an application in a computing environment, comprising a computer infrastructure is operable to compress an html message and send the compressed html message as an SMS message over telephony.

In another aspect of the invention, a computer program product comprising a computer usable medium having readable program code embodied in the medium is provided. The computer program product includes at least one component to perform the steps of the invention. For example, the computer program product includes at least one component to compress an html message and force the compressed html message to be sent over telephony.

DETAILED DESCRIPTION OF EMBODIMENTS OF THE INVENTION

Figure 1:
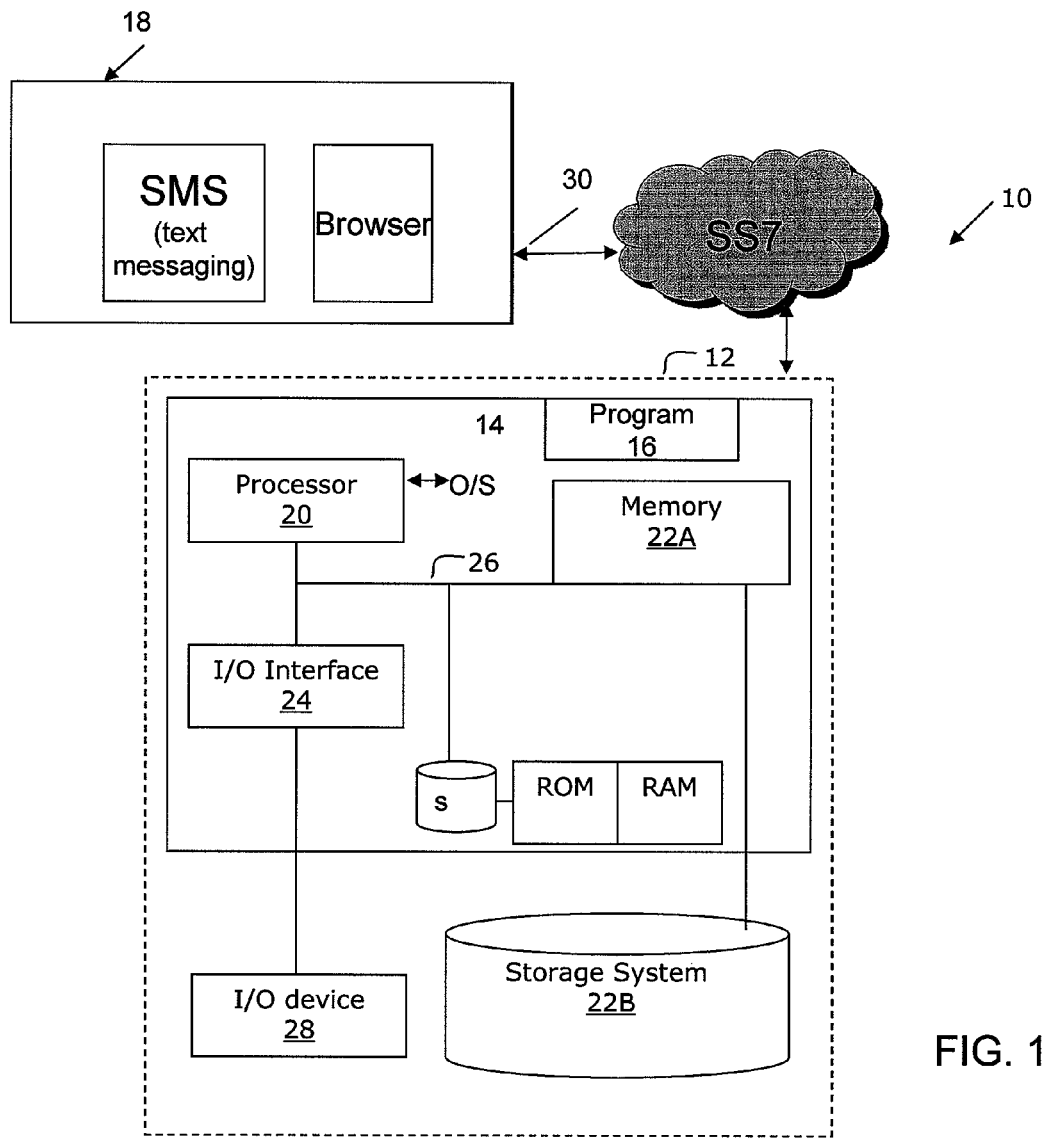
FIG. 1 shows an illustrative environment for implementing the steps in accordance with the invention.

The invention generally relates to a system and method for sending compressed html messages and, more particularly, the invention relates to a system and method for sending compressed html messages over a telephony protocol. In preferred embodiments, the compressed html messages are sent via SMS using, for example, SS7 protocol. In one embodiment, the system and method of the invention is configured to force a return message to be sent via SMS using the SS7 protocol. As should be known to those of skill in the art, SS7 bandwidth is a low usage bandwidth. The system and method of the invention can be implemented over any network, for example, and any existing mobile device and related infrastructure can be modified to take advantage of the benefits and functionality of the system and method of the invention.

In implementation, the system and method of the invention compresses an html message using, for example, .tar, .rar, zip or gzip compression algorithms. Once compressed, the html message can be sent via SMS messaging. In embodiments, the system and method of the invention is configured to ensure that the compressed message does not exceed a predetermined length, depending on the protocol. By way of illustrative example, the message should not exceed 255 characters for a SMS (using SS7 protocol). This may be accomplished, in addition to compression, by splitting the message to an appropriate size.

In further embodiments, the html message may include an SMS tag which forces the recipient using an SMS capable device to communicate via SMS. This can be applicable over a wide variety of applications including, for example, voting, polling, and in use with premium-rated short messages. This response may be a simple text message, a hyperlink or a compressed html message, any of which uses SS7 protocol to send SMS messages. The advantage of the SMS capable html is the ability to send messages to an SMS queue. This allows for a User Datagram Protocol (UDP) type message or MQ type message, where the telephone does not wait for a response from the service.

IBM® WebSphere® MQ delivers reliable application integration for applications and Web services, allowing the user to fully leverage existing software and hardware investments. (IBM and WebSphere are trademarks of IBM Corporation in the United States, other countries, or both.) WebSphere MQ provides a messaging backbone for deploying an enterprise service bus (ESB) as the connectivity layer of a service-orientated architecture (SOA). WebSphere MQ also increases flexibility and offers increased transparency, reliability and audit ability of data movement compared to file transfer protocol (FTP) based approaches. Moreover, WebSphere MQ supports both de facto interface MQI and industry standard JMS V1.1 interface, with integrated publish-and-subscribe support, in addition to supporting secure Internet communication with industry standard Secure Sockets Layer (SSL).

By way of a non-limiting illustrative example, an SMS address tag can be used inside an html to force a return message to be sent via SMS. For example, an SMS tag can be:
<sms href="sms://404.555.5555">Here is my sms link </sms>

The "href" tag informs the system it is a hyperlink and the "sms://" informs the system to use SS7 protocol on the device, the latter of which forces the message to be sent via SMS over SS7. In this example, the tag forces the system to dial "404.555.5555". From this example, several advantages can be realized including, amongst other advantages:

The correct sending number will always be used since the number is placed within the tag;

Additional revenue can be assured by the mobile provider or other third party since the SMS will always be pushed through the SS7 protocol; and Polling becomes more accurate since the contestant information can be provided directly to the recipient.

In further embodiments, the SMS address tag or html header can include body information such as, for example, user information, user requests, etc. In still further implementations, an SMS message can be pushed to the user with the tagging information such that the recipient can respond automatically to the message without the need to enter any numbers. This is due to the coding in the message tag.

In further implementations, a user can link to a website and respond to a question, poll or send other messages via SS7 protocol, by having such response linked to the tag described above. For example, based on the coding of the tag, the response will be forced through SS7, bypassing TCP/IP. In further implementations, any website can be coded or linked to the coding (via a database, for example) to a particular selection such that sending a communication (e.g., polling, voting, etc.) will be forced through SS7, through the tagging described herein.

System Environment

FIG. 1 shows an illustrative environment 10 for managing the processes in accordance with the invention. The illustrative environment may be any computing device such as, for example, a server or workstation and may represent both a local system and a remote system implementing the processes of the invention. In one preferred embodiment, the illustrative environment is implemented with any mobile telephone or device 18 using any known operating system. The device 18 may also be a non-mobile device, initially being implemented on a server.

The environment includes computer infrastructure 12 having computing device 14. More specifically, computing device 14 includes program 16 which is configured and structured to, amongst other features, compress html messages and send the messages via SMS. In implementation, this program 16 may be resident on a sending computer, which compress the html message and, in embodiment, with a tag send the message to a mobile device 18, capable of text messaging. The program 16 can store computer code which includes compression algorithms and SMS tag information such as, for example:

<sms href="sms://404.555.5555"? singer=Matt>Here is my sms link </sms>

This tag will be sent to the mobile device 18 with the compressed html message, forcing the mobile device to respond in SMS, using the telephone number "404.555.5555." In this manner, the return message will be sent over SS7 protocol to the sender or other designated number. In further implementations, the mobile device is configured to decompress the html message, in addition to compress a response html message for sending to the client in SMS. The compression algorithm on both the mobile device 18 and computing device 14 may be any known compression algorithm such as, for example, .tar, .rar, zip or gzip compression algorithms.

Additionally, in further embodiments, program 16 includes executable code, which may be stored temporarily or permanently in memory 22A. As should be understood by those of skill in the art, the executable code can be configured to implement the above functions.

In examples, .tar, .rar, zip or gzip compression algorithms compress the html message to a manageable size for transmission by using SMS. The html message may include an embedded SMS tag, which forces any response to be sent via an SMS message. In embodiments, the recipient can decompress the html message for viewing and, if preferred, can, in response, compress another html message for sending to the originator. In preferred embodiment, the return message is forced to be sent via SMS due to the SMS tag.

Still referring to FIG. 1, memory 22A can include local memory employed during actual execution of program code, bulk storage, and cache memories which provide temporary storage of at least some program to reduce the number of times code must be retrieved from bulk storage during execution. Computer infrastructure 12 further includes processor 20, input/output (I/O) interface 24, bus 26, Storage "S", ROM, RAM and external I/O device/resource 28.

External I/O device/resource 28 may be a keyboard, display, pointing device, or any device that enables computer infrastructure 12 to communicate with one or more other computing devices using any type of communications link 30. Communications link 30 can be, for example, wired and/or wireless links; one or more types of networks (e.g., the Internet, a wide area network, a local area network, a virtual private network, etc.); and/or any known transmission techniques and protocols such as, for example, TCP/IP or SS7.

Processor 20 executes the computer program code and logic of the system and method of the invention, which is stored in memory 22A. While executing the computer program code, etc., processor 20 can read and/or write data to/from memory 22A, storage system 22B, and/or I/O interface 24. Bus 26 provides a communications link between each of the components in computing device 14.

Flow Diagram Implementing Steps of the Invention

Figure 2:
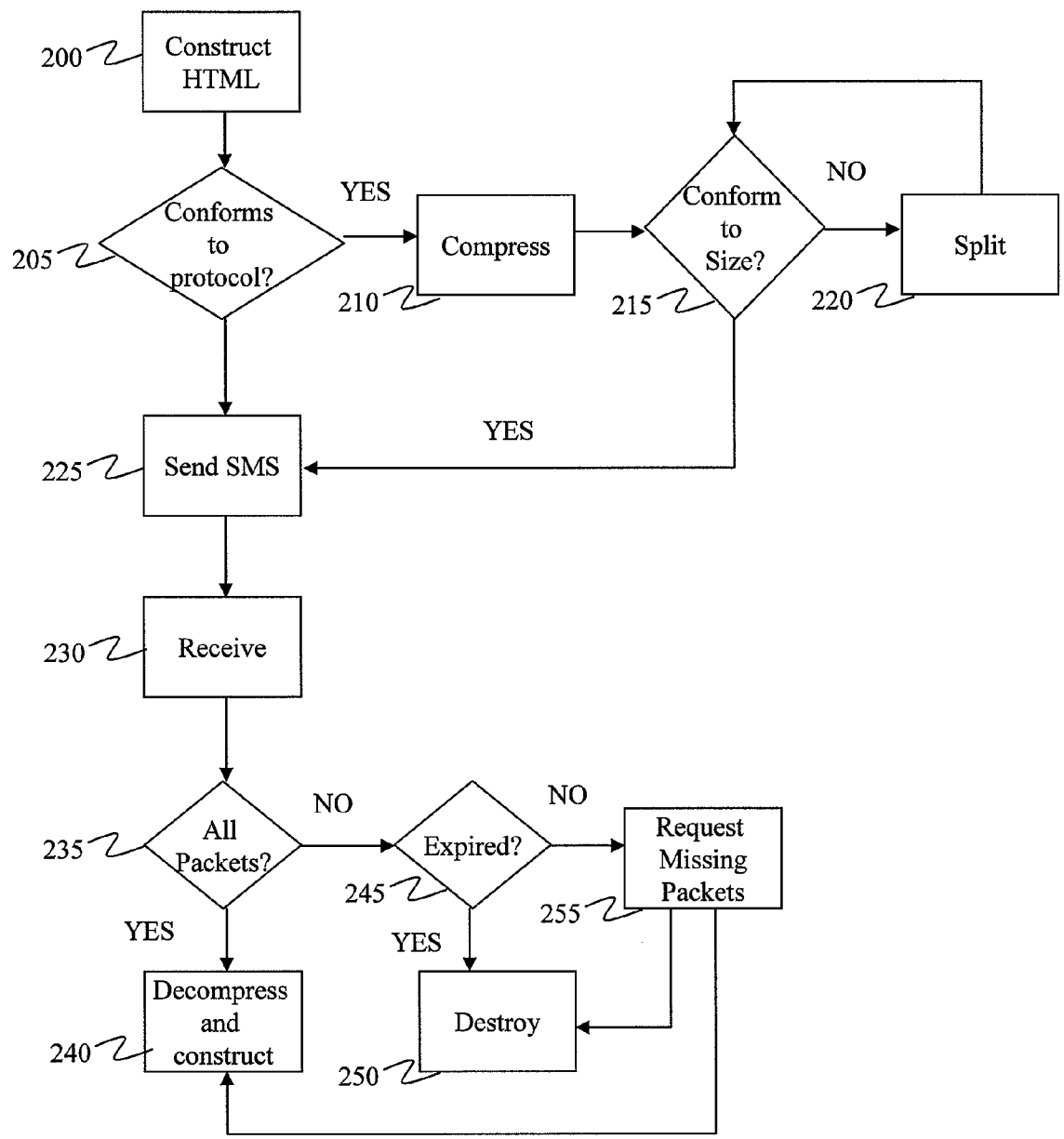
FIGS. 2 and 3 show flow diagrams implementing steps in accordance with the invention.
Figure 3:
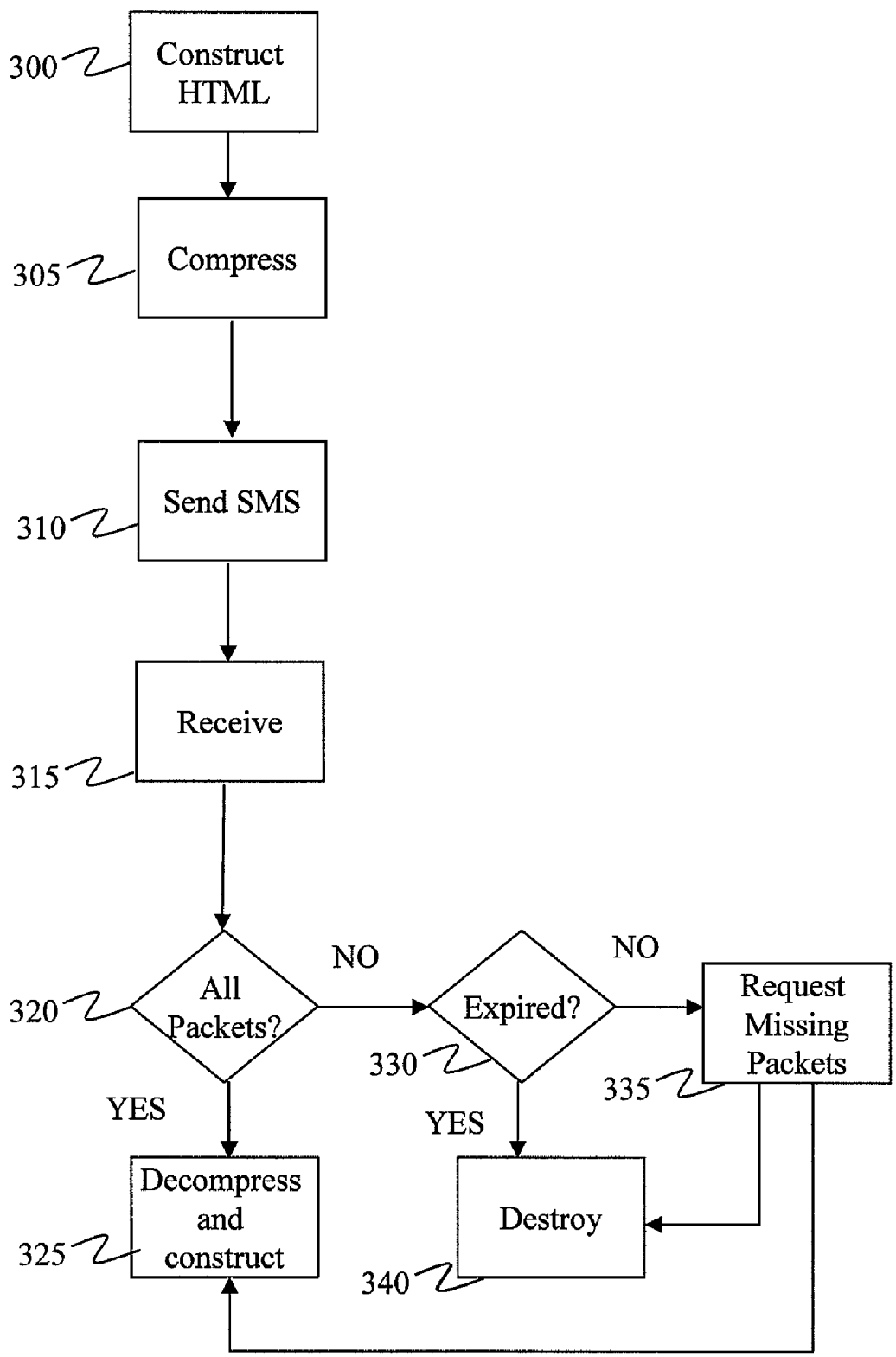

FIGS. 2 and 3 represent flow diagrams implementing steps of various embodiments of the invention. FIGS. 2 and 3 may be implemented in the environment of FIG. 1, using the graphical displays of FIGS. 4-8, and implemented, in practice using any type of server and mobile device configuration compatible with SMS. The steps of the invention may equally represent a high-level block diagram of the invention.

The invention can take the form of an entirely hardware embodiment, an entirely software embodiment or an embodiment containing both hardware and software elements. The software elements may be firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CDR/W) and DVD.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

In FIG. 2, at step 200, a server (or mobile or other user) constructs an html message to send to a recipient. In embodiments, the message may include an SMS tag, as discussed herein, which forces any return message to be sent via SMS. At step 205, a determination is made as to whether the html conforms to a predetermined protocol, i.e., SS7. In more particularity, the process of the invention determines whether the message is greater than the maximum allowable characters, permitting by SMS, e.g., 255 characters. If the message is greater than the size dictated by the protocol, at step 210, the html message is compressed. The compression algorithm may be, for example, .tar, .rar, .zip or gzip.

At step 215, a determination is made as to whether the compressed html message conforms to the package size for the protocol such as SMS messages, e.g., 255. If the package size does not conform, at step 220, the message is split and the process returns to step 215. This loop continues until the size of each packet conforms to the protocol size, e.g., SMS size requirement.

Once it is determined that the size of the packet(s) is in conformance, at step 225, the packet(s) are sent via SS7 protocol; that is, the packet is sent by SMS message. Also, if the message conforms to the required size at step 205, the process would continue to step 225.

At step 230, a recipient receives the packet(s). At step 235, a determination is made as to whether all of the packets are received. This may be determined by reading header information of the packets, as should be well understood by those of skill in the art. For example, the header may include an identifier indicating that N number of packets is to be received from the sender. In one non-limiting illustration, each header of each packet may have a number indicating the number of the packet, in the sequence, e.g., N+1 of 30 of packets. If all of the packets are received, at step 240, the recipient will decompress and construct the message using a compatible compression/decompression algorithm. As should now be understood, the recipient may respond with another html using the processes described herein.

If all of the packets are not received, at step 245, at determination is made as to whether the time limit for receiving all of the packets has expired. If the time has expired, at step 250, the received packets are destroyed. If the time period has not expired, the recipient can make a request for the missing packets at step 255. Once all of the packets are received, the process reverts to step 240. Alternatively, if the packets are not received, the process will revert to step 250, after a predetermined amount of time.

In the embodiment of FIG. 3, at step 300, a server (or mobile or other user) constructs an html message to send to a recipient. In embodiments, the message may include an SMS tag, as discussed herein, which forces any return message to be sent via SMS. At step 305, the html message is compressed. In embodiments, the compression algorithm is configured and structured to ensure that the compressed message will not exceed a predetermined size. This may, for example, include automatically splitting the message into several compressed packets. By using such a compression algorithm, it is possible to eliminate many steps of the processed described with reference to FIG. 2.

Once the message is compressed to the appropriate size, at step 310, the packet(s) are sent via SS7 protocol; that is, the packet is sent by SMS message. At step 315, a recipient receives the packet(s). At step 320, a determination is made as to whether all of the packets are received. This may be determined by reading header information of the packets, as discussed above. If all of the packets are received, at step 325, the recipient will decompress and construct the message using a compatible compression/decompression algorithm.

If all of the packets are not received, at step 330, at determination is made as to whether the time limit for receiving all of the packets has expired. If the time has expired, at step 340, the received packets are destroyed. If the time period has not expired, the recipient can make a request for the missing packets at step 335. Once all of the packets are received, the process reverts to step 325. Alternatively, if the packets are not received, the process will revert to step 340, after a predetermined amount of time.

Exemplary Graphical Displays

FIG. 4-8 show exemplary graphical displays of an application using the system and method of the invention. The exemplary graphical displays of FIGS. 4-8 are representative of a polling scenario of a popular television show. It should be understood, though, that the graphical user displays can be used in other applications in accordance with the invention.

Figures 4, 5:
FIGS. 4-8 show various exemplary graphical user displays representative of an SMS based messaging system in accordance with aspects of the invention.

More particularly, FIG. 4 shows a graphical user display on a portable device in which the user accesses an SMS survey. In this example, the SMS message is a compressed html message which has been sent to the device. The web browser of the mobile device is shown displaying a website associated with the compressed html message, after decompression. The html message, in this example, has an embedded SMS tag. In this graphical user display, the user can select "Start Now!" option from the application menu to be taken to the survey screen of FIG. 5.

In FIG. 5, several selections are shown. In this graphical user display, the user is prompted to vote for a favorite performer. By default, the first selection is highlighted. The user may scroll the list using any known mechanism. In the example of FIG. 5, each selection has an SMS tag associated therewith so that, upon a selection, an SMS message is sent to the originating system, which includes the name of the selected contestant.

Figures 6, 7:
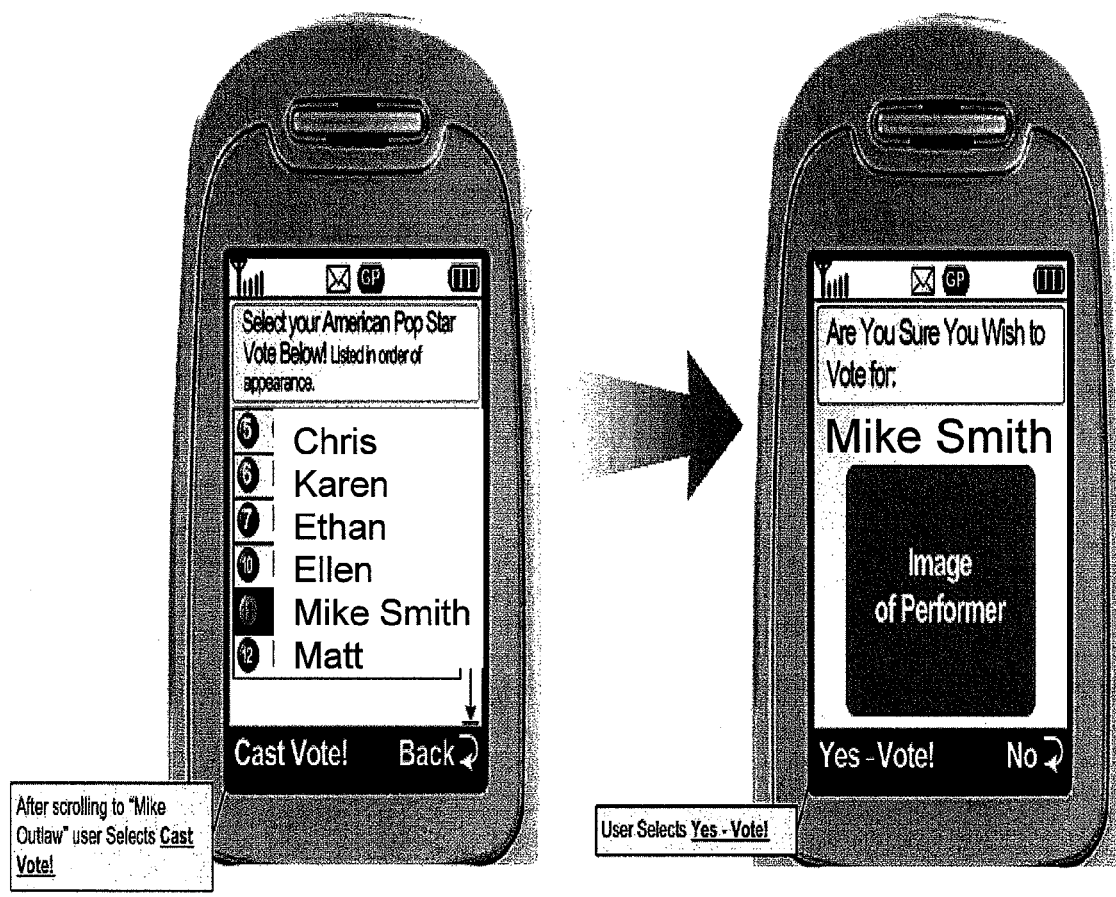

In FIG. 6, the user has scrolled to the desired selection, e.g., "Mike Smith". The user can then select the "Cast Vote!" option from the application menu. In embodiments, the user is then brought to a confirmation page as shown in FIG. 7. In embodiments, the graphical user display can include a message such as, "Are you sure you wish to vote for Mike Smith". In any scenario, the coding of this graphical user display can be, for example, "Are you sure you wish to vote for <selected contestant>". The user may then select the "Yes-Vote" selection or, alternatively, may return to a previous screen to change the selection.

Figure 8:

In the case of the "Yes-Vote", the display of FIG. 8 shows a success message and confirms that the message was sent. In the invention, since the selection included the SMS tag, the selection was automatically sent to a desired number via SMS over SS7 protocol. The user may select the "OK" selection to return to the default screen of the device.

As should be recognized, the graphical user interfaces may be a website having the SMS tag. For example, the graphical display of FIG. 4 may be a display of a message or post which, in one example, may be a survey. The message may include the SMS tag embedded within a website which is provided to the device via SMS. Once decompressed, the displays of FIGS. 5-7 may be websites, working over TCP/IP. However, the graphical display of FIG. 6, for example, includes SMS tags associated with each of the contestants such that upon selection of a contestant, the vote (response) will automatically be sent to a recipient using the coding within the SMS tag, i.e., telephone number, calling information from the sender, selection, etc. The SMS tag thus forces the response to be sent via SMS over SS7, regardless of whether the user is on a website which is received via TCP/IP or an SMS message. In an optional step, as shown in FIG. 8, the user may receive a message, in return, indicating that the vote (or other message) was received.

While the invention has been described in terms of embodiments, those skilled in the art will recognize that the invention can be practiced with modifications and in the spirit and scope of the appended claims.

What is claimed is:

1. A method comprising:
    compressing an html message capable of displaying a webpage; and
    sending the compressed html message as an SMS message via a telephony protocol,
    wherein the sent SMS message contains therein the compressed html message,
    the compressed html message is compressed, using a compression algorithm, to a size that allows an SMS system to transmit the SMS message,
    the SMS message is sent from a mobile device and received by a different mobile device,
    the mobile device receiving the SMS message decompresses the html message, and
    the decompressed html message displays the webpage as a graphical user display with graphics and text that allow a recipient to provide input in the webpage.

2. The method of claim 1, wherein the compressed html message is coded with a return number, forcing a return message to be sent via a text message over SS7 protocol.

3. The method of claim 1, wherein the telephony protocol is SS7 protocol, bypassing TCP/IP.

4. The method of claim 1, wherein the compressed html message is broken into packets and configured to be decompressed and reassembled by a receiving party.

5. The method of claim 1, wherein the compressed html message includes header information indicating a number of received packet(s).

6. The method of claim 1, further comprising determining whether all sent packets comprising the compressed html message have been received and, if so, decompressing and constructing the compressed html message.

7. The method of claim 1, further comprising determining whether all sent packets comprising the compressed html message have been received and, if not, determining whether a time period has expired.

8. The method of claim 7, further comprising one of: destroying the sent packets when the time period has expired and requesting missing packets when the time period has not expired.

9. The method of claim 1, wherein the steps of claim 1 are provided on a subscription, advertising, and/or fee basis.

10. The method of claim 1, wherein the steps of claim 1 are implemented in a computer infrastructure which is maintained, deployed, created or supported by a service provider.

11. A system for deploying an application in a computing environment, the system comprising:
    a CPU, a computer readable memory and a computer readable storage media;
    first program instructions to compress an html message capable of displaying a webpage, and
    second program instructions to send the compressed html message as an SMS message via a telephony protocol, wherein:
    the sent SMS message contains therein the compressed html message;
    the compressed html message is compressed, using a compression algorithm, to a size that allows an SMS system to send the SMS message;
    the SMS message is sent from a mobile device and received by a different mobile device;
    the mobile device receiving the SMS message decompresses the html message;
    the decompressed html message displays the webpage as a graphical user display with graphics and text that allow a recipient to provide input in the webpage; and
    the first and second instructions are stored on the computer readable storage media for execution by the CPU via the computer readable memory.

12. The system of claim 11, wherein the telephony protocol is SS7 and the compressed html message is received as an SMS message.

13. The system of claim 11, wherein the computer infrastructure is operable to insert an SMS tag into the compressed html message forcing a return message to be sent via text messaging over an SS7 telephony protocol.

14. The system of claim 11, wherein the computer infrastructure is operable to break the compressed html message into packets when the compressed html message exceeds a limit.

15. The system of claim 11, wherein the computer infrastructure is operable to provide the compressed html message with header information indicating a number of packet(s).

16. The system of claim 11, wherein contents of the computer infrastructure are provided on a subscription, advertising, and/or fee basis.

17. The system of claim 11, wherein the computer infrastructure is maintained, deployed, created or supported by a service provider.

18. A method for deploying an application in a computing environment, comprising:
    providing a computer infrastructure being operable to compress an html message capable of displaying a webpage, and send the compressed html message as an SMS message over telephony,
    wherein the sent SMS message contains therein the compressed html message,
    the compressed html message is compressed, using a compression algorithm, to a size that allows an SMS system to transmit the SMS message,
    the SMS message is sent from a mobile device and received by a different mobile device,
    the mobile device receiving the SMS message decompresses the html message, and
    the decompressed html message displays the webpage as a graphical user display with graphics and text that allow a recipient to provide input in the webpage.

19. The method of claim 18, wherein the compressed html message is coded with a return number, forcing a return message to be sent via a text message over SS7 protocol.

20. The method of claim 18, wherein the compressed html message is sent as an SMS message via a network and a mobile device.

21. The method of claim 20, wherein the telephony utilizes an SS7 protocol, bypassing TCP/IP.

22. The method of claim 18, wherein the compressed html message is broken into packets to be decompressed and reassembled by a receiving party.

23. The method of claim 22, further comprising determining whether all sent packets comprising the compressed html message have been received and, if so, decompressing and constructing the compressed html message.

24. The method of claim 22, further comprising determining whether all sent packets comprising the compressed html message have been received and, if not, determining whether a time period has expired.

25. The method of claim 24, further comprising one of: destroying the sent packets when the time period has expired and requesting missing packets when the time period has not expired.

26. The method of claim 18, wherein the steps of claim 18 are provided on a subscription, advertising, and/or fee basis.

27. The method of claim 18, wherein the steps of claim 18 are implemented in a computer infrastructure which is maintained, deployed, created or supported by a service provider.

28. A computer program product comprising a computer usable tangible storage medium having readable program code embodied in the tangible storage medium, the computer program product includes at least one component to compress an html message capable of displaying a webpage, force the compressed html message to be sent as an SMS message over telephony,
    wherein the sent SMS message contains therein the compressed html message,
    the compressed html message is compressed, using a compression algorithm, to a size that allows an SMS system to transmit the SMS message,
    the SMS message is sent from a mobile device and received by a different mobile device,
    the mobile device receiving the SMS message decompresses the html message, and
    the decompressed html message displays the webpage as a graphical user display with graphics and text that allow a recipient to provide input in the webpage.

* * * * *